(12) United States Patent
Haugaard et al.

(10) Patent No.: US 12,489,346 B2
(45) Date of Patent: Dec. 2, 2025

(54) PUMP MOTOR WITH COOLED TWO-PART ELECTRONIC MODULE

(71) Applicant: GRUNDFOS HOLDING A/S, Bjerringbro (DK)

(72) Inventors: Mikkel Haugaard, Bjerringbro (DK); Steen Mikkelsen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 337 days.

(21) Appl. No.: 18/012,697

(22) PCT Filed: Jun. 17, 2021

(86) PCT No.: PCT/EP2021/066419
§ 371 (c)(1),
(2) Date: Dec. 23, 2022

(87) PCT Pub. No.: WO2021/259754
PCT Pub. Date: Dec. 30, 2021

(65) Prior Publication Data
US 2023/0299646 A1    Sep. 21, 2023

(30) Foreign Application Priority Data
Jun. 26, 2020  (EP) .................................... 20182463

(51) Int. Cl.
*H02K 11/33*  (2016.01)
*H02K 5/18*  (2006.01)
(Continued)

(52) U.S. Cl.
CPC .............. *H02K 11/33* (2016.01); *H02K 5/18* (2013.01); *H02K 5/207* (2021.01); *H02K 9/06* (2013.01);
(Continued)

(58) Field of Classification Search
CPC . F04D 13/0686; F04D 29/5813; H02K 11/30; H02K 11/33; H02K 11/40;
(Continued)

(56) References Cited

U.S. PATENT DOCUMENTS 4,963,778 A * 10/1990 Jensen .................... H02K 17/30
                                                          310/160
10,988,013 B2 * 4/2021 Chai ...................... H02K 11/33
(Continued)

FOREIGN PATENT DOCUMENTS

DE         19927741 A1    12/1999
DE    102010005767 A1     7/2011
(Continued)

*Primary Examiner* — Naishadh N Desai
(74) *Attorney, Agent, or Firm* — McGlew and Tuttle, P.C.

(57) ABSTRACT

A pump motor (1) includes a rotor (2) mounted to a drive shaft (3) extending along a rotor axis (L). The rotor (2) is circumferentially embraced by a stator. A stator housing (5), encloses the stator. The stator housing includes a first axial end and a second axial end. Electronics for powering and controlling the motor operation include a first portion, arranged on a first PCB, and a second portion, arranged on a second PCB (51). A first electronics housing (11) accommodates the first PCB. The first electronics housing (11) is arranged at a perimeter of the stator housing (5). A second electronics housing (47) accommodates the second PCB (51). The second electronics housing (47) is arranged at the second axial end of the stator housing (5). The second electronics housing (47) at least partially rings the drive shaft (3).

21 Claims, 6 Drawing Sheets

(51) Int. Cl.
*H02K 5/20* (2006.01)
*H02K 9/06* (2006.01)
*H02K 9/22* (2006.01)
*H02K 11/40* (2016.01)

(52) U.S. Cl.
CPC ............ *H02K 9/227* (2021.01); *H02K 11/40* (2016.01); *H02K 2211/03* (2013.01)

(58) Field of Classification Search
CPC ...... H02K 2211/03; H02K 5/18; H02K 5/207; H02K 5/225; H02K 9/06; H02K 9/227
See application file for complete search history.

(56) References Cited

U.S. PATENT DOCUMENTS

2016/0006315 A1* 1/2016 Winterer ................. H02K 5/18
 310/71
2019/0103784 A1* 4/2019 Kamada ................. H02K 11/40
2019/0207462 A1* 7/2019 Uematsu ................ H02K 11/33

FOREIGN PATENT DOCUMENTS

EP 2607709 A1 6/2013
WO 2013135465 A1 9/2013

* cited by examiner

PUMP MOTOR WITH COOLED TWO-PART ELECTRONIC MODULE

CROSS REFERENCE TO RELATED APPLICATIONS

This application is a United States National Phase Application of International Application PCT/EP2021/066419, filed Jun. 17, 2021, and claims the benefit of priority under 35 U.S.C. § 119 of European Application 20182463.8, filed Jun. 26, 2020, the entire contents of which are incorporated herein by reference.

TECHNICAL FIELD

The present disclosure relates generally to pump motors, i.e. pump motors typically used to drive any kind of pumps, in particular speed-controlled multistage or single-stage centrifugal pumps. Preferably, the pump motor is part of a pump assembly including the pump. The present disclosure is particularly applicable for pump motors with a power above 0.7 kW.

BACKGROUND

Typically, pump motors comprise a stator housing accommodating a stator embracing a rotor being mounted on a rotor shaft. The rotor shaft extends along a rotor axis and protrudes out of a drive-end of the stator housing to drive an impeller of a pump. It is known, e.g. from WO 2013/135465 A1, to arrange a cooling fan at a non-drive-end of the stator housing, so that cooling air flows along the axially extending lateral cooling ribs of the stator housing. The cooling fan is typically driven by the rotor shaft protruding out of the non-drive-end of the stator housing.

In WO 2013/135465 A1, an electronics housing is mounted to a perimeter of the stator housing. The electronics housing accommodates the control electronics for controlling the motor operation, i.e. the control electronics comprise a frequency converter for controlling the motor speed. During motor operation, the control electronics generate heat that must be dissipated to avoid damage and malfunction of the electronics. WO 2013/135465 A1 suggests that the electronics housing project beyond the non-drive end of the stator housing for receiving part of the radial flow of the cooling fan and thus cooling the control electronics within the electronics housing.

However, the solution of WO 2013/135465 A1 has the disadvantage that the electronics housing is relatively large compared to the stator housing. Previous attempts to reduce the size of the electronics housing encountered limits set by the requirement of sufficient heat dissipation of the control electronics.

SUMMARY

It is thus a problem of the present disclosure to provide a more compact pump motor with sufficient cooling of the control electronics.

In accordance with a first aspect of the present disclosure, a pump motor is provided, wherein the pump motor comprises

- a rotor mounted to a drive shaft extending along a rotor axis, wherein the rotor is circumferentially embraced by a stator,
- a stator housing enclosing the stator, wherein the stator housing comprises a first axial end and a second axial end,
- electronics for powering and controlling the motor operation, wherein a first portion of the electronics are arranged on a first PCB and a second portion of the electronics are arranged on a second PCB, and
- a first electronics housing accommodating the first PCB, wherein the first electronics housing is arranged at a perimeter of the stator housing.

Furthermore, the pump motor comprises a second electronics housing accommodating the second PCB, wherein the second electronics housing is arranged at the second axial end of the stator housing, wherein the second electronics housing at least partially rings the drive shaft.

The term "rings" or "ringing" shall mean herein that the drive shaft is at least partially circumferenced by an outer surface of the second electronics housing. In other words, the drive shaft protrudes through the second electronics housing without protruding into the inner volume of the second electronics housing.

Optionally, the first portion of the electronics may comprise power electronics and the second portion of the electronics may comprise a line filter. Preferably, the electronics comprises a frequency converter for controlling the motor speed. The power electronics may comprise the inverter circuitry of the frequency converter generating a substantial amount of heat during motor operation. Components that generate less heat, such as the rectifier circuitry or the DC link of the frequency converter, are preferably arranged on the first PCB. However, the rectifier circuitry and/or the DC link may alternatively be arranged on the second PCB in the second electronics housing. The line filter being connected to an input side of the rectifier circuitry is preferably arranged on the second PCB in the second electronics housing, because the quite bulky components thereof allow for a smaller design of the first electronics housing. Furthermore, the components of the line filter also generate substantial heat that must be dissipated to avoid any damage to the electronics.

Optionally, the drive shaft may protrude out of the first axial end of the stator housing for driving a pump, and the drive shaft may protrude out of the second axial end of the stator housing for driving a cooling fan. In other words, the second electronics housing is arranged at a non-drive end of the pump motor and a pump is coupled to the drive end of the pump motor. Preferably, the pump motor may further comprise a cooling fan being mounted to the drive shaft, wherein the second electronics housing is arranged axially between the cooling fan and the second axial end of the stator housing. This has the advantage that the outer surface of the second electronics housing is cooled by the air flow driven by the cooling fan.

Optionally, the pump motor may further comprise a fan cover, wherein the cooling fan is a radial fan being arranged axially between the fan cover and the second electronics housing, wherein the fan cover is configured to guide a cooling fan outlet flow axially along lateral sides of the second electronics housing towards axially extending lateral stator housing cooling ribs. Preferably, the fan cover may comprise a fully closed axial front face. This has the advantage that noise generated by the pump motor is significantly absorbed by the cooling fan cover. The pump motor is thus significantly less noisy.

Optionally, the second electronics housing may define a central axial channel through which the drive shaft extends. Preferably, such a channel may define a cooling fan suction inlet for the cooling fan that is mounted to the drive shaft. Thus, the radial cooling fan does not suck in air through the closed axial front face, but through the central axial channel of the second electronics housing. Therefore, the cooling fan and the fan cover guide the cooling air flow along a 180° turn, which uses the inlet flow as well as the outlet flow of the cooling fan for cooling the components of the pump motor. The inlet flow is predominantly used for cooling the electronics, whereas the outlet flow is predominantly used for cooling the stator housing.

Optionally, the second electronics housing comprises an output connection facing towards the first electronics housing. The output connection may be a wired connection and/or a plug-socket connection.

Optionally, the second electronics housing may be mountable to the second axial end of the stator housing as a preassembled unit. This facilitates and speeds up the assembling process of the motor pump.

Optionally, the second PCB may extend in a plane perpendicular to the rotor axis and may comprise a hole through which the drive shaft extends. The second electronics housing may thus define an essentially donut-shaped inner volume, in which the second PCB is arranged in form of an annular-shaped plane perpendicular to the rotor axis. This arrangement further reduces the space consumption and allows for a very compact design of the pump motor.

Optionally, inlet flow paths are defined between the first electronics housing and the stator housing. Therefore, the inlet flow of the cooling fan cools both the stator housing and the components of the first electronics housing before it reaches, through the central axial channel defined by the second electronics housing, the cooling fan. The radial cooling fan then drives the outlet flow radially outward, where the fan cover redirects the outlet flow axially along lateral sides of the ribbed stator housing.

Optionally, the first electronics housing may comprise a first housing part and a second housing part, wherein the first housing part is thermally coupled to the stator housing, and wherein the second housing part comprising the first PCB is thermally decoupled from the first housing part and from the stator housing. Preferably, the first housing part may be made of the same metallic material that the stator housing is made of. The first housing part may even be integrally molded as a part of the stator housing. Preferably, the first housing part may be arranged closer to the rotor axis than the second housing part.

Optionally, the first housing part may comprise a first material having a first thermal conductivity, and the second housing part may comprise a second material having a second thermal conductivity, wherein the first thermal conductivity is significantly higher than the second thermal conductivity. For instance, the first material may be metal and the second material may be plastic.

Optionally, the first PCB may be thermally coupled to a heat sink being arranged between the first PCB and the stator housing, wherein the heat sink comprises heat sink cooling ribs facing towards the stator housing, wherein the stator housing comprises stator housing cooling ribs facing towards the heat sink, wherein the heat sink cooling ribs and the stator housing cooling ribs complement each other to define inlet flow paths towards a cooling fan suction inlet defined by the second electronics housing. Preferably, the inlet flow paths follow a curved path with an inlet arranged at a lateral side of the first electronics housing and an outlet arranged axially within the first electronics housing.

Optionally, the heat sink cooling ribs and the stator housing cooling ribs are thermally decoupled from each other by a distance. Therefore, the heat sink cooling ribs and the stator housing cooling ribs are close enough to each other to define the inlet flow paths, but have a distance to each other large enough to reduce a heat transfer between the heat sink cooling ribs and the stator housing cooling ribs. Therefore, the heat sink cooling ribs and the stator housing cooling ribs may have different temperature, because the heat sink cooling ribs predominantly dissipate heat generated by the power electronics of the first PCB and the stator housing cooling ribs predominantly dissipate heat generated by the stator. The thermal decoupling between the heat sink cooling ribs and the stator housing cooling ribs reduces in particular the risk of a heat transfer from hot stator housing cooling ribs to the heat sink cooling ribs, which would reduce their capacity to dissipate the heat generated by the power electronics. The thermal decoupling effectively allows for a more compact design of the first electronics housing, because both the heat sink cooling ribs and the stator housing cooling ribs are cooled independent from each other by the same inlet flow along the inlet flow paths they define together.

Optionally, the heat sink cooling ribs and the stator housing cooling ribs define curved inlet flow paths from a lateral flow path inlet towards the second axial end of the stator housing. The curved inlet flow paths are beneficial for the heat dissipating effect of the cooling inflow.

Optionally, the first electronics housing may comprise a projecting portion projecting axially beyond the second axial end of the stator housing, wherein the projecting portion receives at least a portion of the second electronics housing. In other words, the first electronics housing and the second electronics housing may define together an L-shape, along which there is an internal inlet flow path along the L-shape between the two electronics housings and the stator housing. A first leg of the L-shape extends axially between the first electronics housing and the stator housing and a second leg of the L-shape extends radially between the second electronics housing and the stator housing.

Optionally, the first electronics housing may define an outer lateral flow path inlet and an inner flow path outlet directed towards the second electronics housing. Thus, there is a radially inward flow at the axial side of the second electronics housing that faces towards the stator housing.

Optionally, the second electronics housing may be fixed to the stator housing by at least one electrically conducting screw, wherein said at least one screw electrically connects a ground of the second PCB to the stator housing. This is a very efficient way to fix the electronics housing to the stator housing and to provide an electrical ground for both the second PCB and the stator housing.

Optionally, the second electronics housing may comprise a power connector at a lateral side of the second electronics housing, so that the first PCB in the first electronics housing is powered via the second PCB in the second electronics housing. Preferably, the first housing part of the first electronics housing may comprise a lateral opening through which a power plug may be connected to the power connector of the second electronics housing. The power plug is preferably angled in order to contribute to the overall compact design of the pump motor.

Optionally, the second electronics housing may at least partially protrude into the first electronics housing.

Optionally, the second PCB may comprise at least one hole through which the at least one screw protrudes, wherein the second PCB comprises a ground contact around the hole.

This is a very efficient way to provide the ground contact by the screw that fixes the second electronics housing to the stator housing.

Optionally, the second electronics housing may comprise at least one pilot hole for receiving the at least one screw, wherein the second electronics housing comprises an electrically conducting element at the pilot hole for electrically connecting the at least one screw and the ground contact of the second PCB, wherein tightening the at least one screw presses the electrically conducting element onto the ground contact of the second PCB.

According to another aspect of the present disclosure, a pump motor is provided comprising a power plug for plugging into a power socket defined by the second electronics housing, wherein the power plug comprises
- at least one crimp connector having a plugging end facing towards the power socket and a crimping end opposite the plugging end,
- at least one screw terminal element having a first receptable and a second receptable, and
- at least one cable wire,
- wherein the crimping end of each crimp connector is inserted into the first receptable of one of the at least one screw terminal element, and wherein each cable wire is inserted into the second receptable of one of the at least one screw terminal element.

This specific power plug provides a selective option to use the power plug without the at least one screw terminal element when the cable wire is crimped directly to the crimp connector and to use the screw terminal element as an intermediary between the cable wire and the crimp connector if service personnel shall be given the opportunity to easily connect and disconnect the cable wire from the screw terminal element.

Optionally, the power socket is located at a lateral side of the second electronics housing.

Optionally, each cable wire is selectively connectable to the crimp connector either by crimping the cable wire directly to the crimping end or by a first screw fixing the crimping end of each crimp connector in the first receptable of one of the at least one screw terminal and by a second screw fixing the cable wire in the second receptable of one of the at least one screw terminal element.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
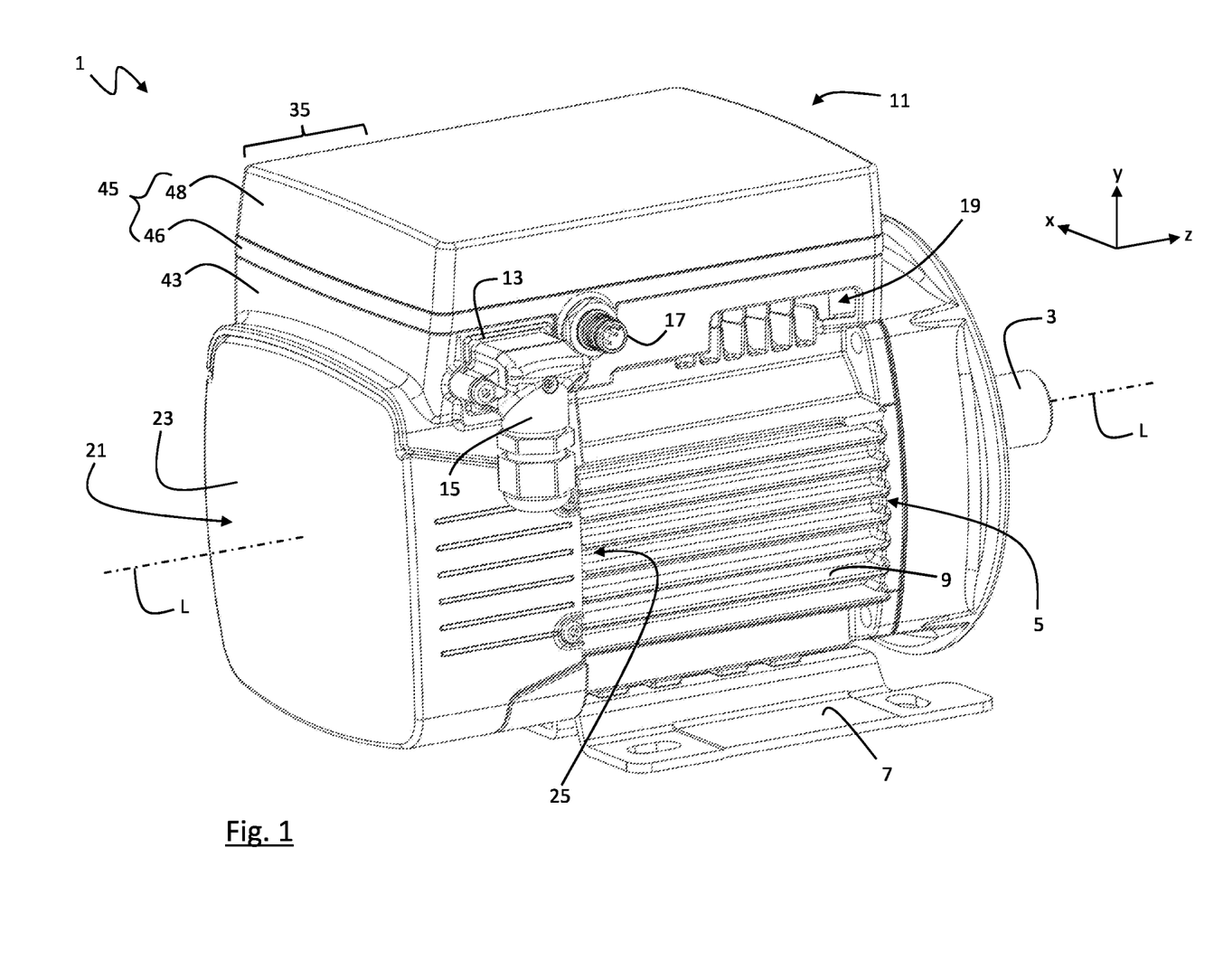
FIG. 1 is a perspective view of an embodiment of a pump according to the present disclosure.

Referring to the drawings, FIG. 1 shows a compact pump motor 1 according to the present disclosure. In order to facilitate the technical description of the present disclosure, the figures show a local right-handed Cartesian coordinate system, wherein a rotor axis L of the pump motor 1 extends along the z-axis, a lateral axis extends along the x-axis and a vertical axis extends along the y-axis. Please note that the local Cartesian coordinate system can have any spatial orientation depending on how the pump motor 1 is actually arranged. However, to facilitate the technical description of the present disclosure, spatial terms like "vertical", "upper", "lower", "forward", "backward", "front", "rear", "left" or "right" refer to a view on the pump motor 1 in negative z-direction. Therefore, the positive z-axis is denoted as a forward direction, the positive x-axis is denoted as a lateral direction to the right, and the positive y-axis is denoted as an upward direction.

The pump motor 1 comprises a rotor 2 (see FIG. 4) mounted to a drive shaft 3 extending along the rotor axis L. The rotor 2 is circumferentially embraced by a stator (not visible) being enclosed by a stator housing 5. The stator housing 5 comprises a forward facing first axial end and a rearward facing second axial end. The pump motor 1 further comprises a mounting bracket 7 or foot for mounting the pump motor 1 to an external body, e.g. a ground floor, wall or ceiling. The mounting bracket 7 is fixed to a lower side of the stator housing 5. A left lateral side of the stator housing 5 comprises lateral stator housing cooling ribs 9 extending essentially parallel to the rotor axis L. A right lateral side of the stator housing 5 is not visible in FIG. 1, but comprises analogously lateral stator housing cooling ribs 9 extending essentially parallel to the rotor axis L.

The pump motor 1 further comprises a first electronics housing 11 at an upper side of the stator housing 5. The electronics housing 11 comprises an opening 13 through which a power plug 15 is plugged in. The opening 13 is arranged at a left lateral side of a rear portion 35 of the first electronics housing 11. Slightly more forward next to the opening 13, a signal connector 17 is arranged at the left lateral side of the electronics housing 11. In a forward section of the electronics housing 11, the left lateral side of the electronics housing 11 further defines a cooling flow inlet 19, into which cooling air is sucked in by a cooling fan 39 (see FIG. 4). The axial rear end of the pump motor 1 is defined by a fan cover 21 comprising a fully closed axial front face 23. The fan cover 21 guides the air flow towards cooling flow outlets 25 directed at the left and right lateral sides of the stator housing 5 guiding the cooling air outflow forward along the lateral stator housing cooling ribs 9.

Figure 2:
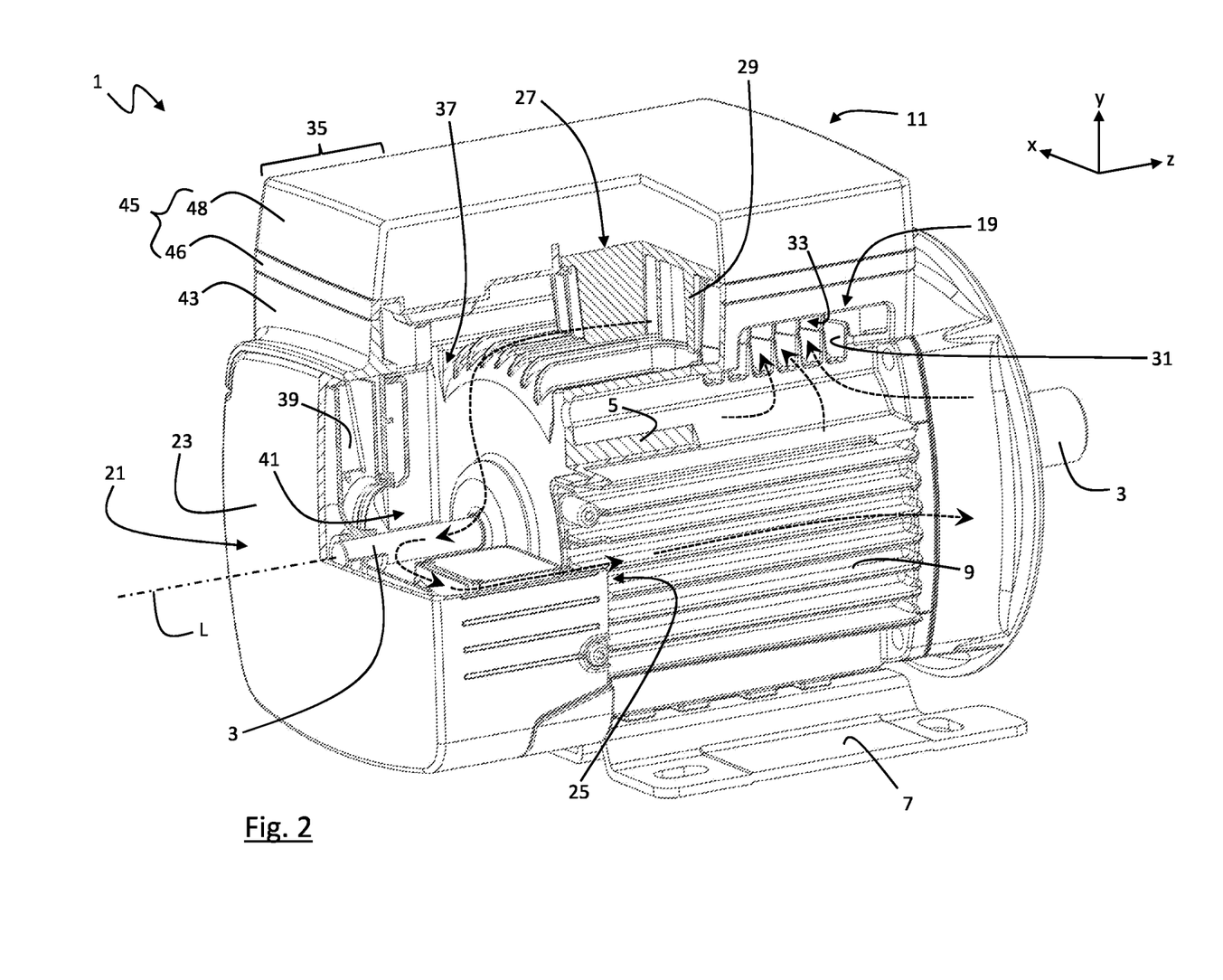
FIG. 2 is a partial sectional perspective view of the embodiment shown in FIG. 1.

FIG. 2 describes the cooling air flow in more detail. The cooling air flow enters the pump motor 1 at the lateral cooling flow inlet 19 defined by the first electronics housing 11. The first electronics housing 11 accommodates a first printed circuit board (PCB) (not shown) that is thermally coupled to an internal heat sink 27 being arranged between the first PCB and an upper side of the stator housing 5. The first PCB extends in the horizontal xz-plane and the heat sink 27 comprises heat sink cooling ribs 29 extending in the horizontal xz-plane and facing towards the upper side of the stator housing 5. The upper side of the stator housing 5 comprises stator housing cooling ribs 31 facing towards the heat sink 27. The heat sink cooling ribs 29 and the stator housing cooling ribs 31 complement each other to define inlet flow paths 33. The inlet flow paths 33 follow a curved path from the lateral cooling flow inlet 19 towards a rear portion of the first electronics housing 11. The rear portion of the first electronics housing 11 defines a projecting portion 35 of the first electronics housing 11 projecting axially beyond the rear axial end of the stator housing 5. The projecting portion 35 comprises a radially inward, i.e. downward, facing opening 37 through which the cooling air flow passes radially inward towards the drive shaft 3 projecting backwardly out of the rear axial end of the stator housing 5. A cooling fan 39 is mounted to the rear axial end of the drive shaft 3 and sucks the cooling air flow through a central axial channel 41 extending axially between the axial rear end of the stator housing 5 and the cooling fan 39 and circumferentially about drive shaft 3. The cooling fan 39 is a radial fan driving the cooling air radially outward. The fan cover 21 then redirects the cooling air flow forward along the left and right lateral sides of the stator housing 5, where the cooling air flow leaves the pump motor 1 at the cooling flow outlets 25 for passing along the lateral stator housing cooling ribs 9. It should be noted that the cooling air flow though the pump motor 1 is fully internal between the cooling flow inlet 19 and the cooling flow outlet 25.

Figure 3:
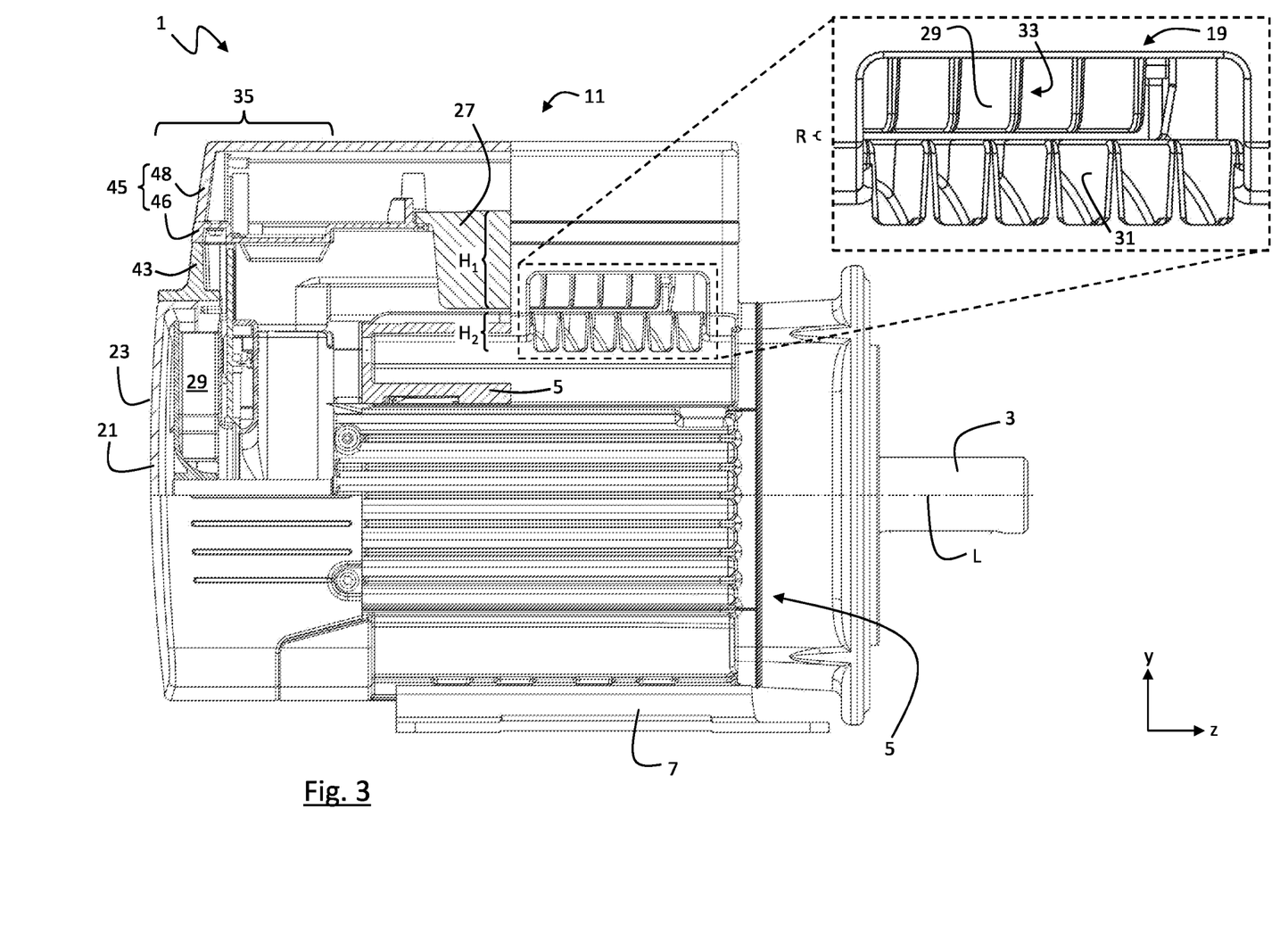
FIG. 3 is a partial sectional view of the embodiment shown in FIGS. 1 and 2, showing an enlarged portion.

The first electronics housing 11 comprises a radially inner, i.e. lower, first housing part 43 and a radially outer, i.e. upper, second housing part 45. The first housing part is thermally coupled to the stator housing 5. In fact, the first housing part 43 is integrally moulded as part of the stator housing 5 and thus made of the same metallic material. In contrast to that, the second housing part 45 is made of plastic and is thermally decoupled from the first housing part 43 and from the stator housing 5. The second housing part 45 comprises the first PCB with the power electronics and the heat sink 27. The second housing part 45 comprises a base part 46 and a lid part 48, wherein the base part 46 acts as a thermal barrier between the first housing part 43 and the lid part 48. The first PCB and the heat sink 27 are mounted to the base part 46, whereas the lid part 48 covers the electronics on the first PCB. As can be seen in FIG. 3, the heat sink cooling ribs 29 and the stator housing cooling ribs 31, which define together the inlet flow paths 31, are thermally decoupled from each other by a distance R. The distance R is preferably smaller than 20% of a height $H_1$ of the heat sink cooling ribs 29, i.e. $R \leq 0.2 \cdot H_1$. The corresponding stator housing cooling ribs 31 have a height $H_2$ that is significantly smaller than the height $H_1$ of the heat sink cooling ribs 29, i.e. $H_2 \leq H_1$. In fact, the stator housing cooling ribs 31 are optional, so that the inlet flow paths 31 may be defined by the heat sink cooling ribs 29 alone. However, it is important to note that there is a very limited or no thermal flow between the heat sink 27 and the stator housing 5 due to the distance R. Therefore, the heat sink 27 and the stator housing 5 are cooled independently by certain fractions of the cooling air flow along the curved inlet flow paths 31. This prevents an undesirable thermal transfer from a hot stator housing 5 to the heat sink 27, which would reduce the capacity of the heat sink 27 to cool the power electronics on the first PCB. Due to the larger height $H_1$ of the heat sink cooling ribs 29, a larger fraction of the cooling capacity of the cooling air flow along the curved inlet flow paths 31 is used for cooling the heat sink 27, and thus the power electronics on the first PCB.

Figure 4:
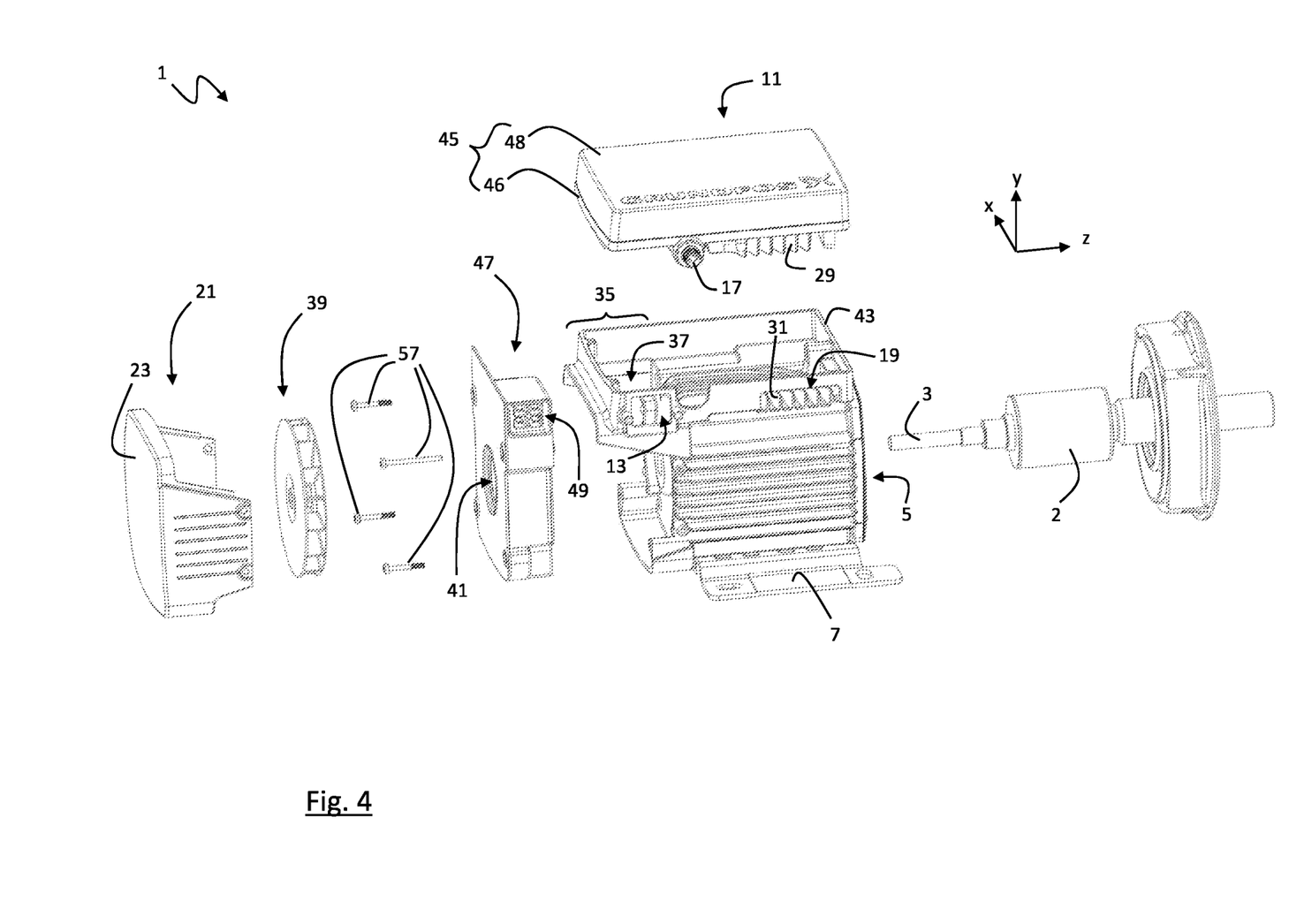
FIG. 4 is an exploded view of components of the embodiment shown in FIGS. 1-3.

The exploded view shown in FIG. 4 shows a second electronics housing 47 being arranged at the rear axial end of the stator housing 5 below the projecting portion 35 of the first electronics housing 11. The second electronics housing 47 accommodates a second PCB 51 (see FIG. 5) and fully rings the drive shaft 3. The second electronics housing 47 defines a central axial channel 41 through which the drive shaft 3 extends. The diameter of the central axial channel 41 is significantly larger than the diameter of the drive shaft 3 extending through the central axial channel 41. Thereby, the central axial channel 41 defines a cooling fan suction inlet for the cooling fan 39. When fully assembled, the second electronics housing 47 protrudes at least partially with an upper portion of the second electronics housing 47 into the protruding portion 35 of the first electronics housing 11. The second electronics housing 47 further comprises a power socket 49 being located at a left lateral side of the upper portion of the second electronics housing 47 protruding into the first electronics housing 11. When fully assembled, the power socket 49 is located at the opening 13 of the first electronics housing 11, so that the power plug 15 can be plugged into the power socket 49 through the opening 13 of the first electronics housing 11. The second electronics housing 47 further defines a vertical cooling air flow path from the lower opening 37 in projecting portion 35 of the first electronics housing 11 towards the central axial channel 41. The second electronics housing 47 is a pre-assembled unit that is mountable to the rear axial end of the stator housing 5 as shown in FIG. 4.

Figure 5:
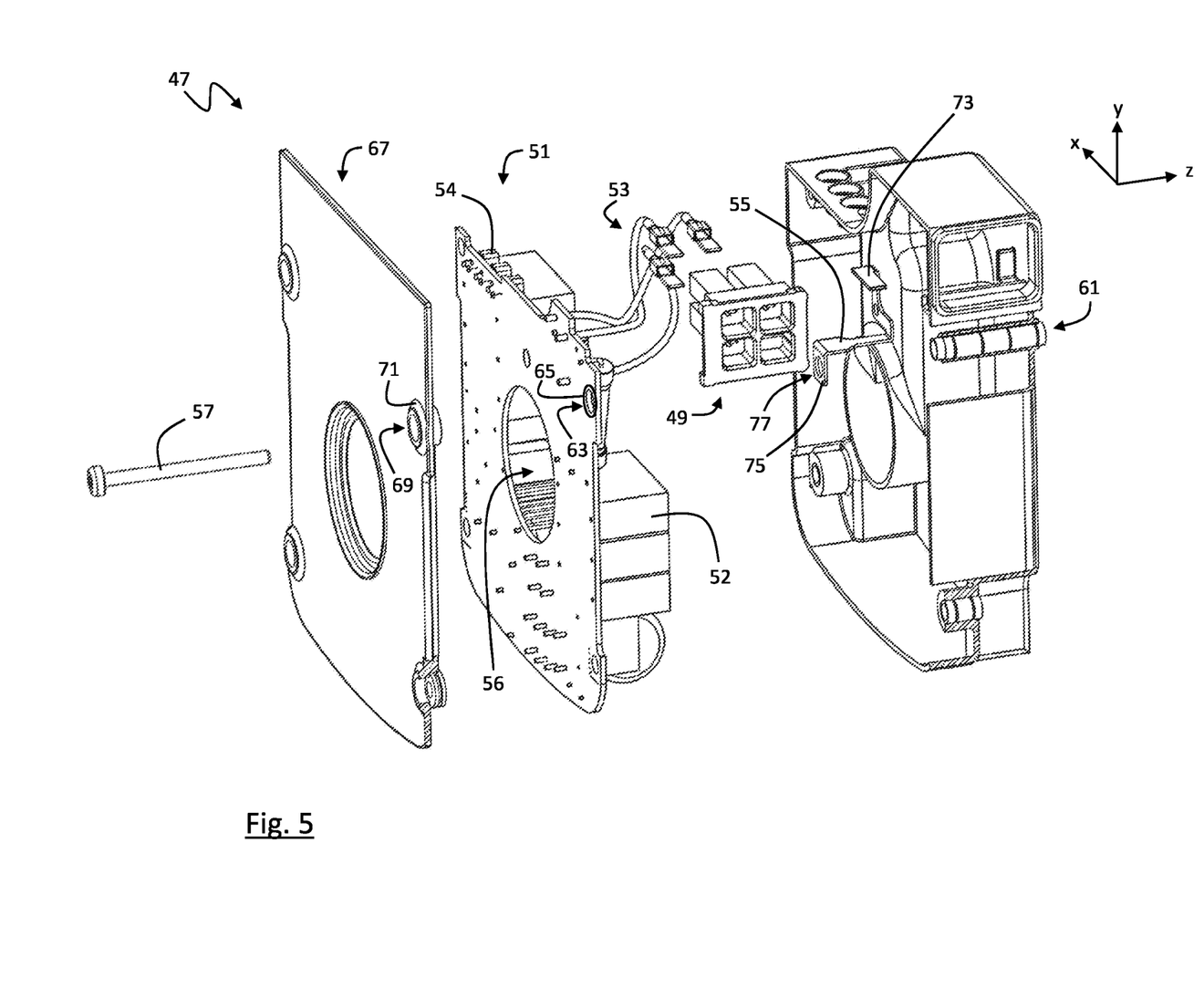
FIG. 5 is an exploded view of the second electronics housing according to the present disclosure.

FIG. 5 shows the second electronics housing 47 in an exploded view in more detail. The second electronics housing 47 defines a donut-shaped inner volume ringing the central axial channel 41, wherein the second PCB 51 is arranged in said inner volume. The second PCB 51 extends in the xy-plane perpendicular to the rotor axis L. The second PCB 51 further comprises a hole 56 through which the central axial channel 41 and, when the pump motor 1 is fully assembled, the drive shaft 3 extends. The second PCB 51 comprises bulky electronics components 52 of a line filter or EMI filter for reducing electromagnetic interference. The line filter electronics of the second PCB 51 is connected to the power plug via input line cables 53. The second PCB 51 further comprises output connectors 54 at an upper end of the second PCB 51 facing towards the projecting portion 35 of the first electronics housing 11. The electronics on the first PCB in the first electronics housing 51 is powered by a connection with the output connectors 54 of the second PCB 51. A ground connector element 55 provides a ground connection between a ground of the power socket 49 and both the ground of the second PCB 51 and the stator housing 5.

FIG. 4 shows four axially extending mounting screws 57 for fixing the second electronics housing 47 to the rear axial end of the stator housing 5. The longer one of the four mounting screws 57 provides for the ground connection between the second PCB 51 and the stator housing 5. A pilot hole 61 of the second electronics housing 47 receives the screw 57 when the second electronics housing 47 is mounted to the rear axial end of the stator housing 5. The mounting screw 57 also passes through a hole 63 in the second PCB 51. An annular connecting surface 65 is provided around the hole 63 at both the forward and backward side of the second PCB 51. The second electronics housing 47 further comprises a lid element 67 also comprising holes 69 through which the mounting screws 57 extend. The holes 69 of the lid element 67 are surrounded by connectors sleeves 71 for establishing an electrical contact between a head of the mounting screw 57 and the annular contact surface 65 around the hole 63 at the backward side of the second PCB 51. The connector element 55 is an angled rigid metallic structure having a first end 73 defining a ground of the power socket 49 and having a second end 75 comprising a hole 77 through which the mounting screw 57 extends. The second end 75 of the connector element 55 connects to the annular connector surface 65 around the hole 63 at the front side of the second PCB 51. A forward end of the mounting screw 57 is screwed into a metallic thread of the stator housing 5. Thereby, when the second electronics housing 47 is fully assembled and mounted to the rear axial end of the stator housing 5, the mounting screw 57 presses all connecting elements 71, 65, 75 together in a sandwiched manner for providing an electrical ground contact.

Figure 6A:
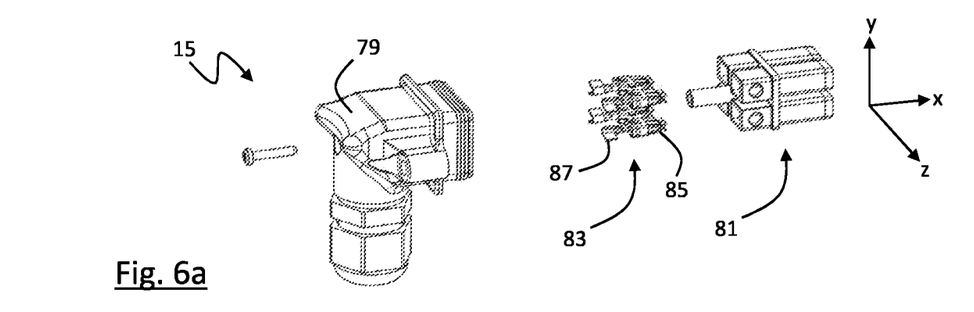
FIGS. 6a, 6b and 6c are exploded views of embodiments of a power plug according to the present disclosure in different configurations.
Figure 6B:
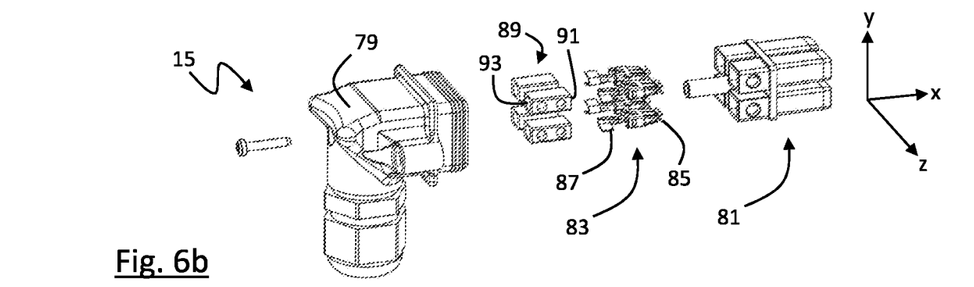
Figure 6C:
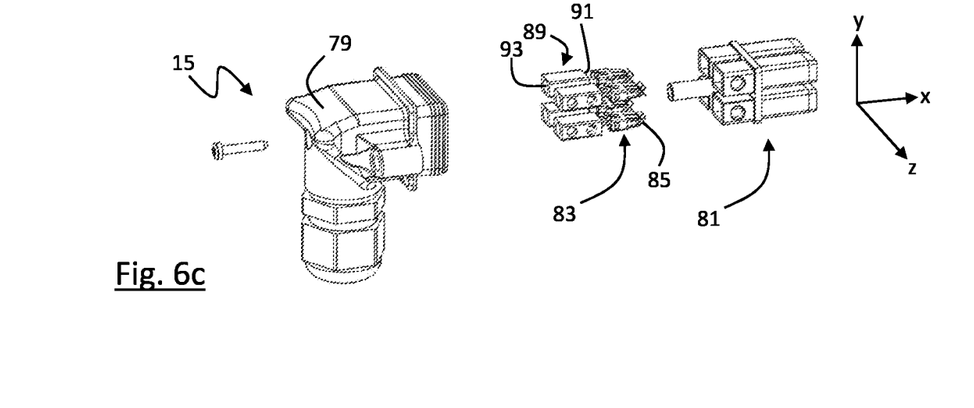

FIGS. 6a-c show the power plug 15 in more detail and in two different configurations. The power plug 15 comprises an angled plug housing 79, wherein a cable (not shown) extends essentially vertically out of the power plug housing 79. An isolation element 81 of the power plug 15 separates the different phases and defines a pin structure for plugging the power plug 15 into the correspondingly shaped power socket 49. For each phase of the power plug 15, i.e. four phases including ground in this example, the power plug 15 comprises a crimp connection 83 having a plugging end 85 facing towards the power socket 49 and a crimping end 87 opposite the plugging end 85. The plugging end is fed into an associated opening in the isolation element 81. The power plug 15 provides two selectable configuration options for connecting wires of the power cable to the crimping end 87 of the crimp connector 83.

As shown in FIG. 6a, the cable wires (not shown) may be directly crimped to the crimping end 87 of the crimp connector 83. The power plug 15 provides a further option by comprising a screw terminal element 89 having a first receptable 91 and a second receptable 93. Therefore, in a second configuration as shown in FIG. 6b,c, the cable wires can be indirectly connected to the crimp connector 83 via the screw terminal element 89, wherein the crimping end 87 of each crimp connector 83 is inserted into the first receptable 91 of the screw terminal element 89, and wherein each cable wire is inserted into the second receptable 93 of the screw terminal element 89. This facilitates maintenance tasks to be performed by service personnel.

The different aspects of the present disclosure contribute alone or in any combination with each other to providing a more compact and less noisy pump motor that is quicker and cheaper to assemble.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 pump motor
2 rotor
3 drive shaft
5 stator housing
7 mounting bracket
9 stator housing cooling ribs
11 first electronics housing
13 opening
15 power plug
17 signal connector
19 cooling flow inlet
21 fan cover
23 front face
25 cooling air outlets
27 internal heat sink
29 heat sink cooling ribs
31 stator housing cooling ribs
33 inlet flow paths
35 projecting portion
39 cooling fan
41 central axial channel
43 first housing part
45 second housing part
46 base part of second housing part
47 second electronics housing
48 lid part of second housing part
49 power socket
51 second PCB
52 electronic components of line filter
54 output connector
55 connector element
56 hole in second PCB
57 mounting screw
61 pilot hole
63 holes in second PCB
65 connecting surface
67 lid element
69 holes in lid element
71 connector sleeves 73 first end of connector element
75 second end of connector element
77 hole in connector element
79 power plug housing
81 isolation element
85 plugging end
89 screw terminal element
91 first receptable
93 second receptable
L rotor axis
R distance
$H_1$ height of heat sink cooling ribs
$H_2$ height of stator housing cooling ribs

The invention claimed is:

1. A pump motor comprising:
a rotor;
a stator;
a drive shaft extending along a rotor axis, wherein the rotor is mounted to the drive shaft and the rotor is circumferentially embraced by the stator;
a stator housing enclosing the stator, wherein the stator housing comprises a first axial end and a second axial end;
electronics for powering and controlling motor operation, wherein a first portion of the electronics are arranged on a first PCB and a second portion of the electronics are arranged on a second PCB;
a first electronics housing accommodating the first PCB, wherein the first electronics housing is arranged at a perimeter of the stator housing; and
a second electronics housing accommodating the second PCB, wherein the second electronics housing is arranged at the second axial end of the stator housing, wherein the second electronics housing at least partially surrounds the drive shaft, wherein the second electronics housing defines a central axial channel through which the drive shaft extends, the channel defining a cooling fan suction inlet for a cooling fan that is mounted to the drive shaft.

2. The pump motor according to claim 1, wherein the first portion of the electronics comprises power electronics, and wherein the second portion of the electronics comprises a line filter, the second electronics housing comprising a second electronics housing interior space, the second PCB being located in the second electronics housing interior space, the drive shaft being located at a spaced location from the second electronics housing interior space.

3. The pump motor according to claim 1, wherein the drive shaft protrudes out of the first axial end of the stator housing for driving a pump, and wherein the drive shaft protrudes out of the second axial end of the stator housing for driving a cooling fan.

4. The pump motor according to claim 1, further comprising a cooling fan being mounted to the drive shaft, wherein the second electronics housing is arranged axially between the cooling fan and the second axial end of the stator housing, the first electronics housing comprising a first electronics housing interior space, the first PCB being arranged in the first electronics housing interior space, the second electronics housing comprising a second electronics housing interior space located external to the first electronics housing interior space, the second PCB being arranged in the second electronics housing interior space.

5. The pump motor according to claim 1, further comprising:
a cooling fan; and
a fan cover, wherein the cooling fan is a radial fan that is arranged axially between the fan cover and the second electronics housing, wherein the fan cover is configured to guide a cooling fan outlet flow axially along lateral sides of the second electronics housing towards axially extending lateral cooling ribs of the stator housing.

6. The pump motor according to claim 5, wherein the fan cover comprises a fully closed axial front face.

7. The pump motor according to claim 1, wherein the second electronics housing comprises an output connection, wherein the output connection faces towards the first electronics housing.

8. The pump motor according to claim 1, wherein the second electronics housing is mountable to the second axial end of the stator housing as a pre-assembled unit.

9. The pump motor according to claim 1, wherein the second PCB extends in a plane perpendicular to the rotor axis and comprises a hole through which the drive shaft extends.

10. The pump motor according to claim 1, wherein inlet flow paths are defined between the first electronics housing and the stator housing.

11. The pump motor according to claim 1, wherein the first electronics housing comprises a first housing part and a second housing part, wherein the first housing part is thermally coupled to the stator housing, and wherein the second housing part, comprising the first PCB, is thermally decoupled from the first housing part and thermally decoupled from the stator housing.

12. The pump motor according to claim 11, wherein the first housing part is arranged closer to the rotor axis than the second housing part.

13. The pump motor according to claim 11, wherein the first housing part comprises a first material having a first thermal conductivity, and wherein the second housing part comprises a second material having a second thermal conductivity, wherein the first thermal conductivity is significantly higher than the second thermal conductivity.

14. The pump motor according to claim 1, wherein the first PCB is thermally coupled to a heat sink that is arranged between the first PCB and the stator housing, wherein the heat sink comprises heat sink cooling ribs facing towards the stator housing, wherein the stator housing comprises stator housing cooling ribs facing towards the heat sink, wherein the heat sink cooling ribs and the stator housing cooling ribs complement each other to define inlet flow paths towards a cooling fan suction inlet defined by the second electronics housing.

15. The pump motor according to claim 14, wherein the heat sink cooling ribs and the stator housing cooling ribs are thermally decoupled from each other by a distance.

16. The pump motor according to claim 14, wherein the heat sink cooling ribs and the stator housing cooling ribs define curved inlet flow paths from a lateral flow path inlet towards the second axial end of the stator housing.

17. The pump motor according to claim 1, wherein the first electronics housing comprises a projecting portion projecting axially beyond the second axial end of the stator housing, wherein the projecting portion receives at least a portion of the second electronics housing.

18. The pump motor according to claim 1, wherein the first electronics housing defines a lateral flow path inlet and a flow path outlet directed towards the second electronics housing.

19. The pump motor according to claim 1, wherein the second electronics housing is fixed to the stator housing by at least one electrically conducting screw, wherein said at least one screw electrically connects a ground of the second PCB to the stator housing.

20. The pump motor according to claim 1, wherein the second PCB comprises at least one hole through which the at least one screw protrudes, wherein the second PCB comprises a ground contact around the hole.

21. The pump motor according to claim 20, wherein the second electronics housing comprises at least one pilot hole for receiving the at least one screw, wherein the second electronics housing comprises an electrically conducting element at the pilot hole for providing a ground connection for the ground contact of the second PCB, wherein tightening the at least one screw presses the electrically conducting element onto the ground contact of the second PCB.

* * * * *